Patented July 4, 1950

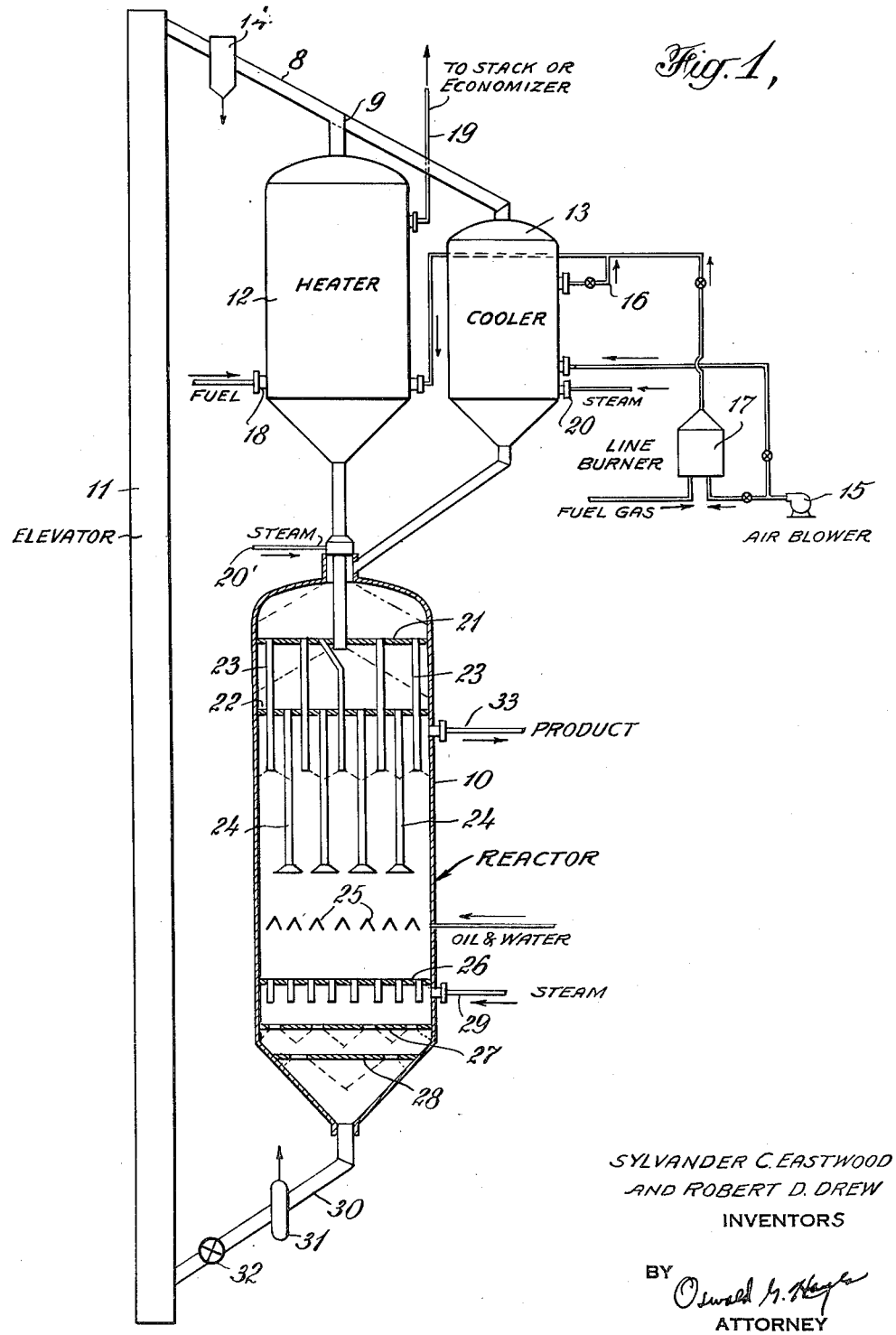

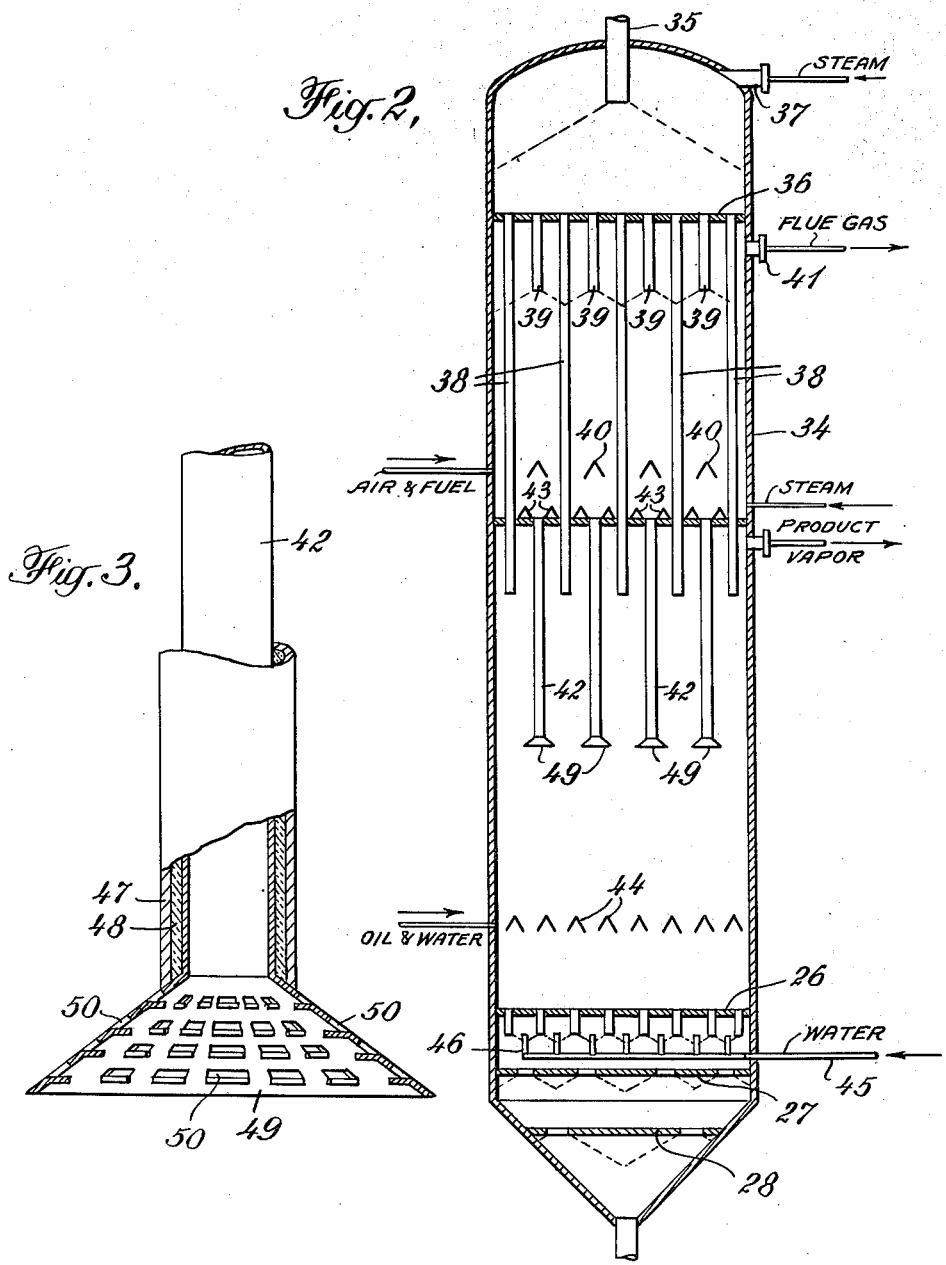

2,513,294

UNITED STATES PATENT OFFICE 2,513,294

PROCESS FOR CONDUCTING CHEMICAL REACTIONS

Sylvander C. Eastwood, Woodbury, and Robert D. Drew, Wenonah, N. J., assignors to Socony-Vacuum Oil Company, Incorporated, a corporation of New York Application August 2, 1946, Serial No. 687,902

12 Claims. (Cl. 196—55)

This invention relates to a process for conducting chemical reactions. Particularly, the invention relates to method and means for inducing desired temperature changes in vapor phase reactants for conducting chemical reactions at high temperatures for short reaction periods.

The invention is peculiarly suited to endothermic reactions, particularly those consuming large amounts of heat. A typical reaction is the conversion of higher boiling hydrocarbons to low boiling olefins by reaction for very short reaction times at elevated temperatures, usually above about 1400° F. For example, crude petroleum or gas oil is readily converted to ethylene with yields in the order of 30% by weight by thermal cracking at about 1500° F. for 0.2 second. Lighter hydrocarbons require higher temperatures, for example, propane is best cracked at 1600° F. or above while ethane requires temperatures on the order of 1700 to 1800° F. to obtain good conversions to ethylene.

In any event, the reaction time must be maintained very short in order to avoid secondary reactions such as condensation to aromatic hydrocarbons. These reactions are extremely difficult to conduct in conventional tube furnaces since the heat transfer rates are relatively low and excessive coke deposits are rapidly built up.

According to the present invention, the charge is rapidly heated to the desired temperature by direct contact with a highly heated granular solid and is then rapidly cooled to temperatures which will inhibit further reaction by contact with a relatively cold solid of the same general nature. The invention provides the relatively hot and relatively cold beds of granular solid as superimposed layers in a single contacting zone. The upper layer is relatively cold solid which rapidly quenches the reaction products and is thereby itself rapidly heated to a temperature approaching the desired reaction temperature. The granular solid moves downwardly through this quenching zone and, at a suitable point, additional heat is added to the bed in order to bring the average temperature of the whole bed at this point to a temperature not lower than that desired for the reaction. Below this point of additional heat input the reactant passes in direct contact with the hot solids and is thereby heated to the desired reaction temperature, and on passing upwardly contacts the cold portion of the bed to be quenched. The cooled solid is then taken from the bottom of the contacting zone and recycled in the system.

As a preferred embodiment, the additional input of heat to make up for that lost by reason of the endothermic nature of the reaction is supplied by a portion of the granular solid heat transfer material circulated through the system. According to this embodiment, one portion of the granular solid is supplied to the top of the contacting zone at a temperature sufficiently below the reaction temperature that it will quench the reaction products to the desired degree. The remainder of the granular solid is heated to a temperature not lower than that at which the reaction is to be conducted and is then supplied to an intermediate portion of the contacting zone as the source of additional heat input. Other suitable methods of adding additional heat include heat transfer coils and hot inert gases, for example highly heated steam and products of combustion introduced directly to the contacting zone.

Two forms of apparatus for practising the preferred embodiment of the invention are shown in the annexed drawings; wherein Figure 1 is a diagrammatic showing of suitable apparatus and includes a cross section of the reactor showing internal construction of this element;

Figure 2 is a vertical section through a vessel which includes both a heater and a reaction section; and Figure 3 is a detail view in partial section of a tube for supplying hot granular solid to an intermediate point in the contacting bed.

Referring specifically now to Figure 1, a granular solid heat transfer material is circulated in a closed cycle including a reactor 10, an elevator 11, a heater 12, and a cooler 13. Granular solid is discharged from the top of elevator 11 to a feed chute 8 having a classifier 14 for removal of particles smaller than that desired in the system. The feed chute 8 is divided at 9 to split the stream and divert a portion thereof to the heater 12 and another portion to the cooler 13. For this purpose the feed chute 8 should be flat bottomed in order that the classification of granular solids in the chute shall not result in a difference in size distribution in the streams diverted to heater 12 and cooler 13. The division of the stream is made on a vertical plane at 14 thus giving the same size distribution in the two streams.

The solids passing downwardly through cooler 13 as a substantially compact moving bed are cooled therein as by passing therethrough a blast of air from compressor 15. This air is heated in cooler 13 and is then transferred by pipe 16 to a line supplying preheated air to heater 12.

To maintain a desired degree of preheat on the air supplied to heater 12, a portion of the air from compressor 15 may be passed through a line burner 17 wherein a small amount of fuel is burned and the effluent is then mixed with the air from pipe 16 and the mixture supplied to heater 12. Gaseous fuel is admitted to heater 12 by inlet port 18 and combustion of this fuel in the preheated air raises the temperature of the granular solids passing downwardly through heater 12 as a substantially compact moving bed, flue gases being removed by line 19 to a stack or suitable economizer. As shown, the solids from heater 12 and cooler 13 are purged with an inert gas, such as steam, admitted at 20 and 20' to insure that combustion supporting gases are not transferred to the reactor.

In the upper portion of the reactor are two bulk supply zones provided by plates 21 and 22. The cold solid from cooler 13 is admitted to the top supply zone above plate 21 while the hot solid from heater 12 is introduced to the lower supply zone between plates 21 and 22. Granular solid supply tubes depend from each of the plates 21 and 22 to supply the granular solid to the desired points in the reaction zone. Cold feed tubes 23 extend downwardly through the lower bulk supply zone to a point below plate 22 where they discharge onto the top of a substantially compact bed of moving solids. Hot supply tubes 24 extend downwardly from the plate 22 to a still lower point in the reactor to introduce the hot granular solid to an intermediate point in the moving bed. At a point still further down, a suitable reactant is introduced, for example, a mixture of oil and water to be vaporized for cracking the oil to give large yields of ethylene. This introduction may be by means of any suitable fluid distributer, such as the inverted angles shown diagrammatically at 25.

Below the reaction zone are a series of flow control plates 26, 27 and 28 which act to induce uniformity of flow across the reactor. Purging steam may be admitted at inlet port 29 below the upper flow control plate 26. The granular solid is then transferred by conduit 30 having a depressuring pot 31 and a valve 32 to the elevator 11 for recirculation in the system.

In a typical operation for the cracking of gas oil in the presence of 10% by weight of steam, the apparatus is operated to give a reaction temperature of 1550° F. and a reaction time of 0.2 second. The oil and water are introduced in liquid phase to be evaporated by the residual heat contained in the granular solid heat transfer material giving an outlet temperature to the elevator of 980° F. Granular solid at this temperature is divided to pass about five parts by weight of the solid through heater 12 and two parts by weight through the cooler 13. The solid is heated in heater 12 to 1600° F. and transferred at that temperature to the reactor. About half the air for the heater 12 is passed through the solids in cooler 13 and is thereby heated to 980° F. and mixed with the other half of the air at 100° F. giving an air stream which will form combustible mixtures with the fuel gas at temperatures below that at which ignition takes place in the burners and supply lines. A gaseous product mixture is withdrawn at outlet port 33 at about 600° F. and is passed to suitable purification equipment for separation of the valuable components thereof.

The apparatus of Figure 2 is generally similar to that of Figure 1 except that no separate cooler is provided and the heating zone is enclosed by the same vessel 34 which contains the reaction zone. Use of this apparatus preferably includes a lower recirculation temperature and this is achieved by cooling the granular solid leaving the bottom of vessel 34 as hereinafter described. Relatively cool granular solid is admitted to the top of vessel 34 from feed pipe 35 to fall onto a plate 36. Steam admitted at 37 serves to seal this bulk supply zone against the admission of air. A number of feed pipes depend from plate 36 and a portion thereof designated by reference character 38 supply relatively cool solid directly to the top of the moving bed in the reaction zone. The remaining feed pipes 39 supply granular solid to the top of a moving bed in a heating zone to which air and fuel are supplied as by inverted angles 40. The flue gas is discharged at outlet port 41. Feed pipes 42 extend downwardly to an intermediate point in the reaction zone to supply hot solids from the heating zone. The heating and reaction zones are effectively isolated by steam or other inert gas pressure supplied at inlet 37 mentioned above and at the inverted angles 43 in the bottom of the heating zone. Oil and water, or if desired oil vapors and steam, are supplied at inverted angles 44 to the reaction zone and are treated in much the same manner.

Preferably, the granular solid withdrawn from the reaction chamber in apparatus of this type is cooled as by a water spray admitted through manifold 45 and branch pipes 46. Vaporization of this water provides purging steam below the flow control plate 26. If it is desired to cool to an extent greater than can be tolerated by the amount of purging steam needed in the bottom of the chamber additional cooling may take place in a separate chamber below the contacting vessel 34.

Since the several feed tubes for granular solid pass through zones of differing temperature, they can be insulated as shown in Figure 3 wherein a supply pipe 42 is fitted with a concentric outer pipe 47 with insulation 48 therebetween. The bottom ends of the pipes supplying hot granular solid to intermediate points in the contacting bed are preferably fitted with flared skirts 49 which act as baffles to provide an open space below the ends of the tubes and thus give the proper ratio between the flow rates from pipes 38 and pipes 42. It is desirable that the flared skirts have orifices therethrough to permit the flow of gases and thus minimize reduction of the effective gas passage at this point. One manner of accomplishing this result is shown in Figure 3 wherein the flared skirts are louvered as indicated at 50.

We claim:

1. A process for cracking hydrocarbons which comprises: maintaining a substantially compact bed of downwardly moving granular solid heat transfer material in a confined upright zone, withdrawing solid heat transfer from the lower section of said zone, replenishing said bed in part by introducing solid heat transfer material into said bed at an intermediate level at a temperature at least equal to that required for the cracking conversion of said hydrocarbons while in contact with said bed, further replenishing said bed by supplying more of the same heat transfer material onto the surface of said bed in the upper section of said zone at a temperature substantially below that required for the cracking conversion of said hydrocarbons, introducing hydrocarbons into the lower portion of said bed to effect the cracking conversion thereof by contact with the heated heat transfer material, flowing the resulting vapor reaction products upwardly through said bed to contact the cooler heat transfer material present in the upper portion of said bed and to be thereby quenched to a temperature which substantially inhibits further reaction of said products and withdrawing the cooled vapor products from the upper portion of said zone.

2. A process for rapidly heating vapor phase reactants to a desired reaction temperature at which said reactants undergo endothermic reaction and then rapidly cooling the reaction mixture below said reaction temperature which comprises: passing a granular heat transfer material downwardly through a reaction zone as a substantially compact moving bed, withdrawing said material from the bottom of said zone, introducing a portion of said material to the top of said zone at a temperature substantially below the reaction temperature, introducing the remainder of said material to an intermediate portion of said zone at a temperature not lower than said reaction temperature, introducing said reactants to the lower portion of said zone to effect the endothermic conversion thereof while in contact with the heat transfer material, flowing the resulting vapor products upwardly through said bed to contact the cooler heat transfer material present in the upper portion of said bed and to be thereby rapidly cooled to a temperature at which further reaction is substantially inhibited and withdrawing the cooled vapor products from the upper portion of said zone.

3. A process for cracking hydrocarbons which comprises: passing a granular solid heat transfer material downwardly through a reaction zone as a substantially compact moving bed, withdrawing said heat transfer material from the bottom of said zone, introducing granular solid heat transfer material to the top of said zone at a temperature substantially below the temperature of said cracking, introducing hydrocarbons to be cracked to the lower portion of said bed, adding heat to said moving bed at a portion thereof intermediate the top thereof and said lower portion in amount sufficient to supply the heat for cracking said hydrocarbons to lower boiling gasiform hydrocarbons, passing the lower boiling gasiform hydrocarbons upwardly through said bed into contact with the heat transfer in the upper portion of said bed to effect cooling of said hydrocarbons to a temperature at which further reaction is substantially inhibited and withdrawing cooled gasiform hydrocarbons from the upper section of said zone.

4. A process for rapidly heating vapor phase reactants to a desired reaction temperature at which said reactants undergo endothermic reaction and then rapidly cooling the reaction mixture to a temperature at which the reaction is substantially inhibited which comprises: maintaining a substantially compact bed of granular solid heat transfer material in an upright confined zone, withdrawing a stream of used solid material from the bottom of said zone to cause downward movement of solid heat transfer material in said bed, supplying solid heat transfer material onto the surface of said bed in the upper section of said zone at a temperature substantially below said reaction temperature, adding heat to said moving bed at a portion thereof intermediate its upper and lower ends in an amount sufficient to heat the lower portion of said bed to a temperature at least as high as said reaction temperature, introducing said reactants into the lower portion of said bed into contact with the heated heat transfer material to effect the endothermic reaction thereof to form vapor reaction products, passing the vapor reaction products upwardly into contact with the cooler heat transfer material in the upper portion of said bed to cool said products to a temperature at which further reaction is substantially inhibited and withdrawing the cooled reaction products from the upper section of said zone.

5. A process for cracking hydrocarbons which comprises: maintaining a substantially compact bed of downwardly moving granular solid heat transfer material in an elongated conversion zone, introducing a hydrocarbon charge into the lower portion of said bed to effect conversion thereof to vaporous hydrocarbon products, withdrawing used solid heat transfer material from the lower section of said conversion zone, passing a representative portion of said used heat transfer material through a separate heating zone wherein it is heated to a temperature at least equal to that required for the cracking conversion of said hydrocarbons, introducing the heated heat transfer material from said heating zone into said bed in said conversion zone at a level intermediate its ends, passing the remainder of said used heat transfer material through a separate cooling zone wherein it is cooled to a temperature suitable for quenching the cracking reaction which temperature is below substantially the cracking reaction temperature, introducing the cooled heat transfer material from said cooling zone into the upper section of said conversion zone onto the surface of said bed, flowing the vaporous hydrocarbon products formed in the lower portion of said bed upwardly into contact with the cooler heat transfer material in the upper portion of said bed to effect cooling of said products to a temperature at which further reaction of the products is substantially inhibited and withdrawing the cooled vaporous products from the upper section of said conversion zone.

6. A process for rapidly heating vapor phase reactants to a suitable temperature at which said reactants undergo endothermic reaction and then rapidly cooling the reaction mixture to stop the reaction which comprises: passing a granular solid heat transfer material downwardly through a reaction zone as a substantially compact bed of flowing heat transfer material, withdrawing said heat transfer material from the bottom of said zone, introducing a portion of said heat transfer material to the top of said zone at a temperature substantially below said reaction temperature, baffling said flowing heat transfer material within said bed in an intermediate portion of said zone to divert said heat transfer material introduced to the top of said zone from a plurality of spaces in said intermediate portion, introducing the remainder of said heat transfer material to said spaces at a temperature not lower than said reaction temperature, introducing said reactants to the lower portion of said zone to contact the hot heat transfer material and undergo said endothermic reaction to form a gasiform reaction mixture, flowing said gasiform reaction mixture upwardly through said bed to contact cooler heat transfer material present in the upper portion of said bed and to be thereby quenched to a temperature which substantially inhibits further endothermic reaction and withdrawing said gasiform reaction mixture from the upper portion of said zone.

7. A process for conducting endothermic reactions which result in products which are unstable at the reaction temperature which comprises: maintaining a substantially compact bed of downwardly moving granular solid heat transfer material in an elongated conversion zone, introducing the reactant charge into a lower portion of said bed to effect conversion thereof to vaporous reaction products, withdrawing used solid heat transfer material from the lower section of said conversion zone, passing a representative portion of said used heat transfer material through a separate heating zone wherein it is heated to a temperature above that at which said reactant charge undergoes endothermic reaction, introducing the heated heat transfer material from said heating zone into said bed in said conversion zone at a level intermediate its ends, passing the remainder of said used heat transfer material through a separate cooling zone wherein it is cooled to a temperature suitable for quenching said endothermic reaction, introducing the cooled heat transfer material from said cooling zone into the upper section of said conversion zone onto the surface of said bed, flowing the vaporous reaction products formed in the lower portion of said bed upwardly into contact with the cooled heat transfer material in the upper portion of said bed to effect cooling of said products to a temperature at which further reaction of the products is substantially inhibited and withdrawing the cooled vaporous products from the upper section of said conversion zone.

8. The process of claim 1 wherein said hydrocarbons are introduced to said bed below said reaction zone in liquid phase to be thereby vaporized and the resultant vapors are passed upwardly to said zone.

9. The process of claim 2 wherein said reactants are introduced to said bed below said reaction zone in liquid phase to be thereby vaporized and the resultant vapors are passed upwardly to said zone.

10. The process of claim 3 wherein said hydrocarbons are introduced to said bed below said reaction zone in liquid phase to be thereby vaporized and the resultant vapors are passed upwardly to said zone.

11. The process of claim 4 wherein said reactants are introduced to said bed below said reaction zone in liquid phase to be thereby vaporized and the resultant vapors are passed upwardly to said zone.

12. The process of claim 5 wherein said hydrocarbons are introduced to said bed below said reaction zone in liquid phase to be thereby vaporized and the resultant vapors are passed upwardly to said zone.

SYLVANDER C. EASTWOOD.
ROBERT D. DREW.

REFERENCES CITED

The following references are of record in the file of this patent:

UNITED STATES PATENTS

| Number | Name | Date |
|---|---|---|
| 731,682 | Hillig | June 23, 1903 |
| 1,620,431 | Bramwell | Mar. 8, 1927 |
| 2,298,593 | Rubin et al. | Oct. 13, 1942 |
| 2,362,621 | Fahnestock | Nov. 14, 1944 |
| 2,370,816 | Schonberg | Mar. 6, 1945 |
| 2,388,055 | Hemminger | Oct. 30, 1945 |
| 2,388,932 | Ogorzaly | Nov. 13, 1945 |
| 2,389,636 | Raymseyer | Nov. 27, 1945 |
| 2,393,636 | Johnson | Jan. 29, 1946 |
| 2,416,214 | Payne | Feb. 18, 1947 |
| 2,421,840 | Lechthaler et al. | June 10, 1947 |
| 2,422,501 | Roetheli | June 17, 1947 |
| 2,429,161 | Hudson | Oct. 14, 1947 |
| 2,441,170 | Rose et al. | May 11, 1948 |